United States Patent
Berthe De Pommery et al.

(10) Patent No.: US 10,756,323 B2
(45) Date of Patent: Aug. 25, 2020

(54) ASSEMBLY AND ELECTRICAL CONNECTION PART FOR AT LEAST TWO ELECTRICAL ENERGY STORAGE CELLS

(71) Applicant: COMMISSARIAT A L'ENERGIE ATOMIQUE ET AUX ENERGIES ALTERNATIVES, Paris (FR)

(72) Inventors: Yves Berthe De Pommery, Grenoble (FR); Philippe Azais, Saint Egreve (FR); Lionel Picard, Seyssinet Pariset (FR); Guillaume Turin, Lille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 615 days.

(21) Appl. No.: 15/122,341

(22) PCT Filed: Mar. 2, 2015

(86) PCT No.: PCT/EP2015/054284
§ 371 (c)(1),
(2) Date: Aug. 29, 2016

(87) PCT Pub. No.: WO2015/132192
PCT Pub. Date: Sep. 11, 2015

(65) Prior Publication Data
US 2016/0372734 A1    Dec. 22, 2016

(30) Foreign Application Priority Data
Mar. 4, 2014 (FR) ...................... 14 51743

(51) Int. Cl.
*H01M 2/20* (2006.01)
*H01M 2/02* (2006.01)
(Continued)

(52) U.S. Cl.
CPC ............ *H01M 2/206* (2013.01); *H01G 4/005* (2013.01); *H01G 4/385* (2013.01); *H01G 9/016* (2013.01);
(Continued)

(58) Field of Classification Search
CPC ...... H01M 2/202; H01M 2/204; H01M 2/206; H01M 2/0207; H01M 6/46;
(Continued)

(56) References Cited

U.S. PATENT DOCUMENTS

| 1,659,463 A | 2/1928 | Entz |
| 3,971,207 A * | 7/1976 | Murakami ............. G04B 37/08 368/12 |

(Continued)

FOREIGN PATENT DOCUMENTS

| CN | 202434609 U | 9/2012 |
| EP | 1 901 368 A1 | 3/2008 |

OTHER PUBLICATIONS

International Search Report dated May 20, 2015, in PCT/EP2015/054284 filed Mar. 2, 2015.
(Continued)

*Primary Examiner* — Miriam Stagg
*Assistant Examiner* — Lilia Nedialkova
(74) *Attorney, Agent, or Firm* — Oblon, McClelland, Maier & Neustadt, L.L.P.

(57) ABSTRACT

The main purpose of the invention is an assembly and electrical connection part (2) of at least two electrical energy storage cells (1), that will be included in an electric assembly module (20) of an energy storage system, characterised in that the part (2) comprises first (3a) and second (3b) means of connecting the part (2) to said at least two electrical energy storage cells (1), the first (3a) and second (3b) connection means being configured to enable the passage of
(Continued)

connection pins (4) to assemble and electrically connect the part (2) to each of said at least two electrical energy storage cells (1).

30 Claims, 8 Drawing Sheets

(51) Int. Cl.
| | |
|---|---|
| *H01M 2/30* | (2006.01) |
| *H01M 2/10* | (2006.01) |
| *H01G 4/005* | (2006.01) |
| *H01G 4/38* | (2006.01) |
| *H01G 9/008* | (2006.01) |
| *H01G 9/26* | (2006.01) |
| *H01G 11/10* | (2013.01) |
| *H01G 11/26* | (2013.01) |

(52) U.S. Cl.
CPC ............... *H01G 9/26* (2013.01); *H01G 11/10* (2013.01); *H01G 11/26* (2013.01); *H01M 2/0245* (2013.01); *H01M 2/1072* (2013.01); *H01M 2/1077* (2013.01); *H01M 2/30* (2013.01); *H01M 2220/20* (2013.01)

(58) Field of Classification Search
CPC ........... H01M 2220/20; H01M 2/0245; H01M 2/1072; H01M 2/1077; H01M 2/30; G04G 17/083; H01G 11/10; H01G 11/26; H01G 4/005; H01G 4/385; H01G 9/016; H01G 9/26

See application file for complete search history.

(56) References Cited

U.S. PATENT DOCUMENTS

| | | | | |
|---|---|---|---|---|
| 4,624,581 | A * | 11/1986 | Mock | G04B 37/1486 224/164 |
| 5,872,744 | A * | 2/1999 | Taylor | G04G 17/083 224/164 |
| 6,673,485 | B2 | 1/2004 | Kimura et al. | |
| 7,393,608 | B2 | 7/2008 | Cho | |
| 7,914,923 | B2 | 3/2011 | Asahina et al. | |
| 7,923,144 | B2 | 4/2011 | Kohn et al. | |
| 2007/0020516 | A1* | 1/2007 | Yoon | H01M 2/0245 429/152 |
| 2007/0026739 | A1* | 2/2007 | Kim | H01M 2/206 439/627 |
| 2007/0122695 | A1* | 5/2007 | Kim | H01M 2/1016 429/152 |
| 2008/0063929 | A1* | 3/2008 | Byun | H01M 2/202 429/121 |
| 2008/0131767 | A1* | 6/2008 | Kim | H01M 2/0426 429/163 |
| 2008/0182168 | A1 | 7/2008 | Byun et al. | |
| 2008/0199770 | A1 | 8/2008 | Marmaropoulos et al. | |
| 2009/0123820 | A1 | 5/2009 | Han | |
| 2010/0143786 | A1 | 6/2010 | Kim | |
| 2010/0216008 | A1 | 8/2010 | Yoon | |
| 2011/0229754 | A1* | 9/2011 | Zhao | H01M 10/0413 429/158 |
| 2012/0009447 | A1 | 1/2012 | Ikeda et al. | |
| 2012/0058382 | A1 | 3/2012 | Carignan et al. | |
| 2012/0121957 | A1* | 5/2012 | Kwon | H01M 2/204 429/99 |
| 2012/0225333 | A1* | 9/2012 | Kim | H01M 2/021 429/61 |
| 2012/0328920 | A1* | 12/2012 | Takase | H01M 2/1077 429/90 |
| 2013/0028201 | A1 | 1/2013 | Koo et al. | |
| 2013/0130081 | A1* | 5/2013 | Diez | H01M 2/202 429/90 |

OTHER PUBLICATIONS

Preliminary French Search Report dated Aug. 13, 2014 for French Application 1451743 filed Mar. 4, 2014.

* cited by examiner

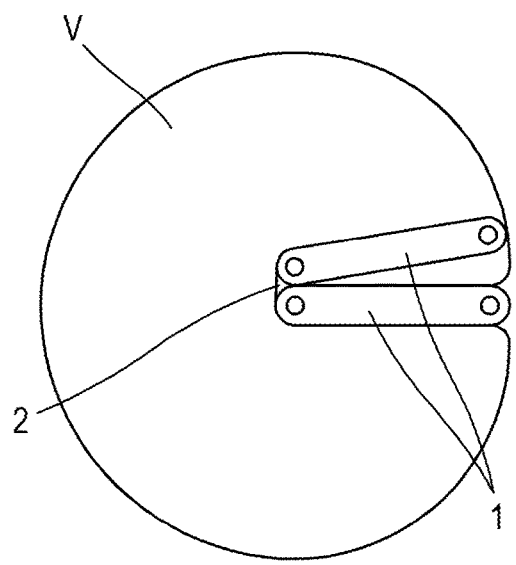
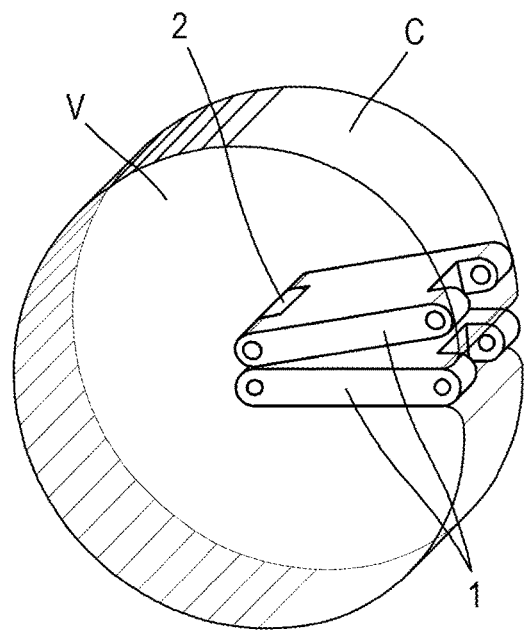
FIG. 5A  FIG. 5B
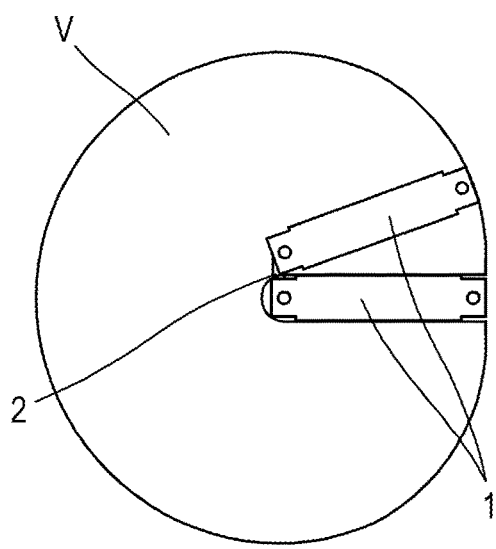
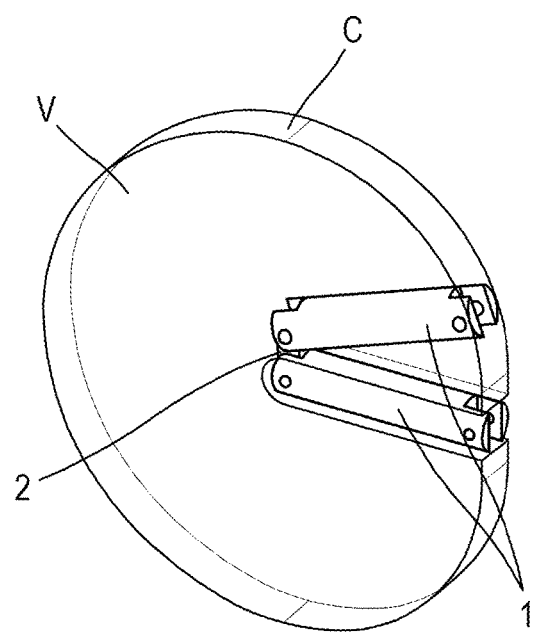
FIG. 6A  FIG. 6B

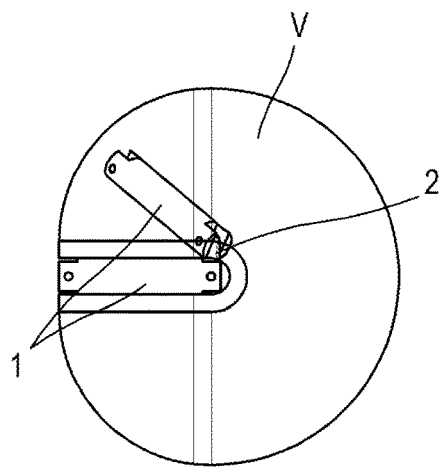
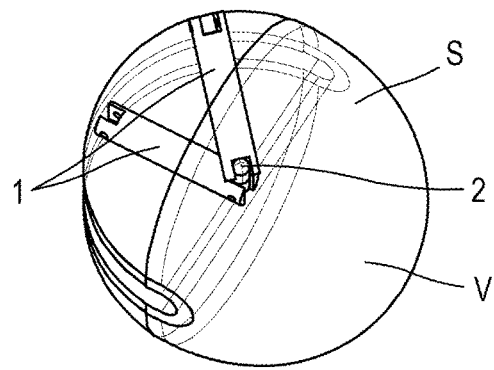
FIG. 10A  FIG. 10B
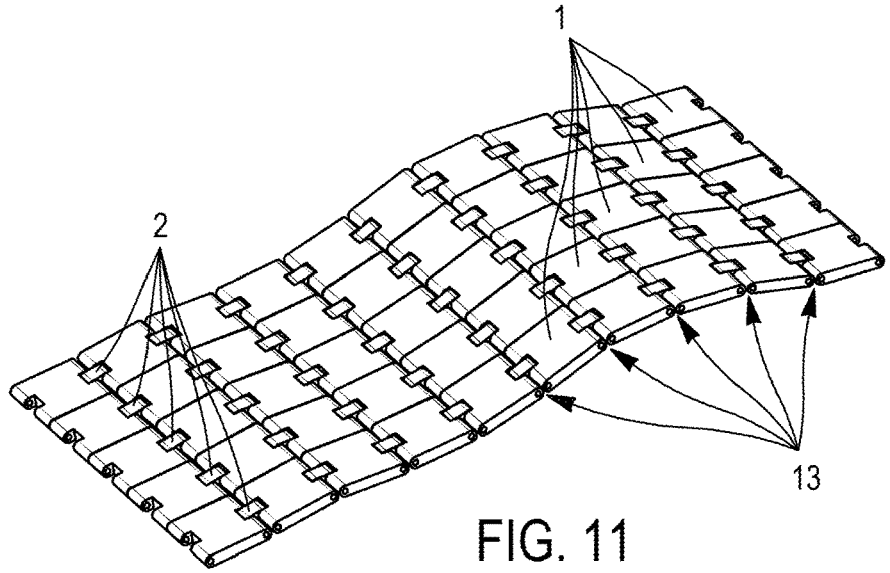
FIG. 11
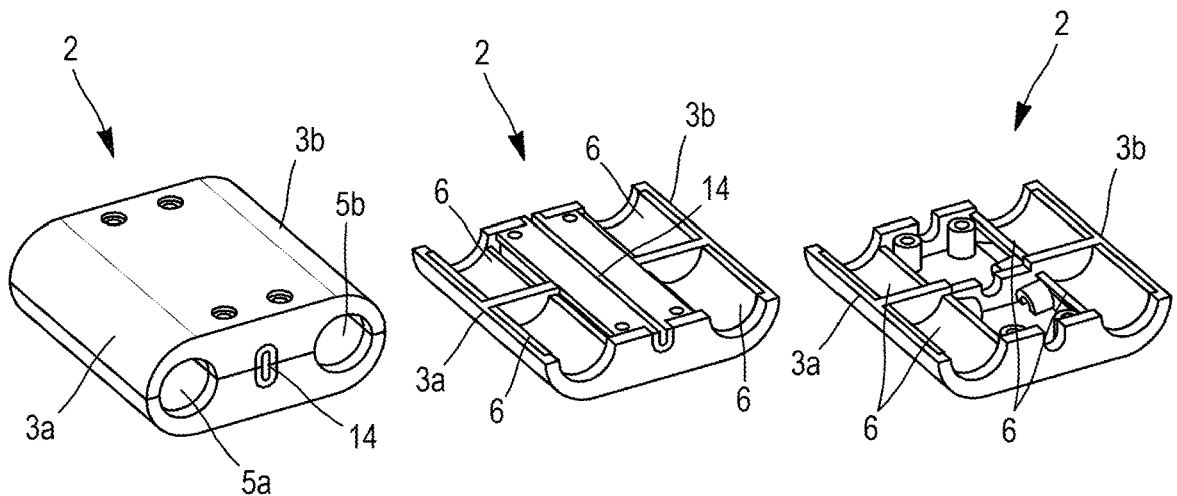
FIG. 12A  FIG. 12B  FIG. 12C

ASSEMBLY AND ELECTRICAL CONNECTION PART FOR AT LEAST TWO ELECTRICAL ENERGY STORAGE CELLS

TECHNICAL DOMAIN

This invention relates to the domain of electrical energy storage cells and particularly the domain of primary or secondary elementary electrochemical cells. Such cells will be assembled within modules themselves assembled to each other to form an energy storage system, for example a battery pack. More specifically, the invention relates to the domain of assembly and electrical connection systems integrated into such electrical energy storage cells.

The invention is preferably applicable to elementary electrochemical cells forming electrochemical generators. However, it may also apply for example to electrochemical or dielectric capacitors and supercapacitors.

It is used in applications in many fields of industry, particularly for stationary or onboard applications, and particularly in the field of electrical power supply for land, air and/or water transport vehicles, for example for the electrical power supply of hybridised and/or electric vehicles for which many electrical energy storage cells have to be laid out.

Three main types of geometry are currently used in the architecture of elementary electrochemical cells. Thus, conventionally and in a manner known in itself, cells may have a cylindrical geometry, a prismatic geometry or a pouch cell geometry.

The invention is preferably applicable to electric storage cells with a prismatic and/or cylindrical geometry, although it can also be concerned by other types of cell geometries.

It thus discloses an assembly and electrical connection part for at least two electrical energy storage cells, one electrical energy storage cell that can be assembled and electrically connected to at least one other cell of the same type by means of such an assembly and connection part, an assembly comprising at least two electrical energy storage cells and an assembly and connection part for said cells, an electrical assembly module comprising a plurality of assembly and connection parts and a plurality of electrical energy storage cells, an energy storage system comprising a plurality of such assembly modules and a method of fabricating such an assembly and electrical connection part and/or such an electrical energy storage cell.

STATE OF PRIOR ART

Accumulators are systems that store electrical energy in chemical form. They are based on a reversible electrochemical system, in other words a rechargeable system. However, unless mentioned otherwise all the following description is valid for primary (not rechargeable) systems.

The electrochemical energy storage system is an assembly of electrochemical modules that are themselves assemblies of elementary electrochemical cells that form accumulators. Electrochemical cells within the energy storage system are connected and managed by control electronics or a BMS (Battery Management System), to optimise charging and discharging and to extend the life.

Accumulators or cells contain chemical reagents that, once activated, supply electricity on demand. These electrochemical reactions are activated within the elementary electrochemical cell between a positive electrode and a negative electrode immersed in an electrolyte, when an electric load is connected to the terminals of the cell. For example, the Li-ion technology consists of using electrochemical circulation of lithium ions in two materials at different potentials; the positive electrode and the negative electrode form the two redox potentials, and the difference in potential creates the voltage within the battery. During use (the accumulator discharges), the negative electrode releases lithium in $Li^+$ ion form. $Li^+$ ions then migrate to the positive electrode through the ion conducting electrolyte. The passage of each $Li^+$ ion within the accumulator is compensated by the passage of an electron in the external circuit (current circulating from the accumulator terminals) in the reverse direction, thus creating the electrical current that operates the device associated with the battery. Electrical current continues until there is no more lithium in the negative electrode: the accumulator is then discharged and it can be recharged using the reverse process.

Electrical connection systems are provided on cells, regardless of whether they are elementary electrochemical cells as described above or more generally electrical energy storage cells, so that cells can be assembled and connected to each other.

Electrical connection systems used at the present time are conventionally made from an outer conducting part, typically a connection add-on tab connecting cells to each other, and two exposed positive and negative electrical terminals located either on the same face (for example in the case of automobile vehicle batteries) or on opposite faces.

However these types of electrical connection systems are not satisfactory due to the danger that they represent, particularly for power elements, both for operators and for the storage cell itself. The external conducting part and exposed terminals increase risks of short circuit.

There are different ways of electrically connecting electrical energy storage cells to each other known in prior art. The two main embodiments are particularly connection of cells through conducting connection rods, for example as disclosed in U.S. Pat. No. 7,393,608 B1, and connection of cells through the assembly module of which they form part and/or the energy storage system that includes the assembly module, for example according to patent application US 2012/0009447 A1 or U.S. Pat. No. 7,923,144 B1.

When conducting connection rods are used between cells, there is either a "rudimentary" module formation system, or an assembly module and/or assembly pack formation system. Formation of a module and/or assembly pack can enable positioning and retention of the cells and other elements (sensors, communication with other systems, electrical and thermal control, etc.), conducting connection rods being added during the formation of the module and/or assembly pack. Other elements are added during the formation of a "rudimentary" module and everything is retained in position by surrounding straps.

Another method of making an electrical connection of cells consists of bringing terminals projecting outside the cells into contact, for example according to U.S. Pat. Nos. 7,914,923 B1 and 6,673,485 B1.

Furthermore, from a safety point of view, patent application US 2012/0058382 A1 discloses a system of add-on connections to prevent electric shocks during and after assembly, and so that cells can be disconnected in case of accident. Patent application US 2013/0029201 A1 discloses the formation of modules of thin cells with a single external connector for each pole of the cells. In reducing the total number of parts, the purpose of this connector is to limit risks of short circuit.

Furthermore, for the modularity of cells, prior art usually discloses an energy storage system formed in the required shape such that it is filled with the required number of cells or modules. Electrical and thermal control systems are added on in the remaining space in the energy storage system. In some cases, there are less conventional arrangements to facilitate the formation of modules or if modules are not necessary, for example as disclosed in the utility model CN 202434609 U, in which the electrical connection system of the cells provides an assembly with the shapes and properties of a roller chain. Another assembly method, for example as described in US patent application 2008/0199770 A1, may consist of using a wire that passes through the elements to hold them in position, the electrical contact then being made by the wire (electrically conducting), or by contact between the different elements (in which case the wire is insulating).

Nevertheless, most of these solutions according to prior art include electrical energy storage cells made with a conducting packaging, typically aluminium, in contact with one of the cell terminals, and always with exposed cell connections on the same side or on each side of the cell. As mentioned above, this type of cell introduces severe risks for the operator's health and for correct operation of the cell, particularly in the case of a high energy cell. Risks for the operator are electrical and are due to the possibility of touching the two terminals or conducting parts in contact with the terminals. There are also risks for the cell due to the creation of a short circuit between the two terminals that can damage the cell or cause serious overheating of it.

Furthermore, for most solutions according to prior art, the electrical connection of the different storage cells is made during the formation of modules and/or assembly packs using the modules or packs, which means that the module and/or pack has to be adapted as a function of the cells used. Furthermore, the result of the possibility of forming modules and/or assembly packs of storage cells consisting of assembling several cells together by squeezing them using a strap and connecting them together is that assembly modules are rectangular, which limits the possibilities of the volume that the final energy storage system can use for the target application.

PRESENTATION OF THE INVENTION

The purpose of the invention is thus to at least partially overcome the needs mentioned above and the disadvantages of embodiments according to prior art.

In particular, the invention discloses a new modular assembly and safety connection principle for electrical energy storage cells that cannot be short circuited.

Thus the purpose of one aspect of the invention is a part for the assembly and electrical connection of at least two electrical energy storage cells that will be included in an electric assembly module of an energy storage system, characterised in that the part comprises first and second means of connecting the part to said at least two electrical energy storage cells respectively, the first and second connection means being configured to enable the passage of connection pins to assemble and electrically connect the part to each of said at least two electrical energy storage cells.

With the invention, it is possible to obtain a modular assembly and a safe connection between electrical energy storage cells that cannot be short circuited.

The assembly and electrical connection part according to the invention may also comprise one or several of the following characteristics taken in isolation or in any technically possible combination.

Advantageously, the external portion of the assembly and electrical connection part, particularly the shell(s) forming its outer packaging, comprises an electrically insulating material.

Furthermore, the first and second connection means may advantageously be configured with the connection pins to form a hinged type mechanical assembly and electrical connection system between the part and each of said at least two electrical energy storage cells.

The first and second connection means may comprise first and second housings through which connection pins can pass for the assembly and electrical connection of the part with each of said at least two electrical energy storage cells respectively.

Each of the first and second housings may comprise at least one negative or positive current collector, particularly in at least a partially cylindrical form, that will at least partially match the shape of a connection pin.

For example, the current collector may be made from a deformable plate, for example formed from an approximately generally cylindrical deformed plate or an approximately generally semi-cylindrical deformed plate.

The first and second housings may be formed in the part approximately parallel to each other.

The distance between the first and second housings may be greater than or equal to the thickness of an electrical energy storage cell.

The first and second housings may be formed in the part approximately orthogonal to each other.

The part may be divided in at least two portions that can be rotated relative to each other.

Rotation of one portion relative to the other portion may be limited through the use of a rotation stop system, and in particular limited to a maximum rotation of 180°.

The part may comprise a system for fastening means of retaining several cells in position relative to each other, particularly in the form of a groove or a hole made on each side at mid-distance from the two connection pins.

The part may comprise one or several onboard electronic systems.

The connection part(s) (mechanical connection parts) may form electrical fuses between cells.

Another purpose of another aspect of the invention is an electrical energy storage cell that can be included within an electrical assembly module of an energy storage system, characterised in that the cell is configured to be assembled and electrically connected to at least one assembly and electrical connection part as defined above, the cell comprising at least one means of receiving an assembly and electrical connection part on at least one of its faces, said at least one reception means being configured to allow the passage of at least one connection pin for assembly and electrical connection between the part and the electrical energy storage cell.

The cell may comprise a first means for reception of a first assembly and electrical connection part on a first face, and a second means for reception of a second assembly and electrical connection part on a second face, particularly the face opposite the first face, each of the first and second reception means being configured to allow the passage of a connection pin for the assembly and electrical connection of the first and second assembly and electrical connection parts with the electrical energy storage cell.

The first face of the cell may comprise two cell portions extending in relief from the first face and defining a first housing between them to contain the first assembly and electrical connection part. The second face of the cell may comprise two cell portions extending in relief from the second face and defining a second housing between them to contain the second assembly and electrical connection part.

Each cell portion in relief may comprise a hole for the passage of a connection pin for the assembly and electrical connection of the cell with an assembly and electrical connection part.

The two cell portions on the first face may form two terminals with the same polarity. The two cell portions of the second face may form two terminals with the same polarity opposite the polarity of the two cell portions on the first face, so that the cell can be installed in series.

The two cell portions on the first face may form a positive polarity terminal and a negative polarity terminal respectively. The two cell portions on the second face may form a positive polarity terminal and a negative polarity terminal respectively, the positive polarity terminals particularly being located on the same side as each other on one side of the cell and the negative polarity terminals particularly being located on the same side as each other and on the other side of the cell, so that the cell can be installed in series or in parallel.

The cell may have a prismatic architectural geometry, particularly including a first reception means on a first face of the cell and a second reception means on a second face of the cell, the first and second faces being opposite each other and particularly located within the cell thickness.

The cell may have a cylindrical architectural geometry, particularly comprising a first reception means on a first face of the cell and a second reception means on a second face of the cell, the first and second faces being opposite each other and particularly located on the two plane faces of the cell.

Furthermore, the purpose of another aspect of the invention is an assembly characterised in that it comprises:
    at least two electrical energy storage cells as defined above;
    at least one assembly and electrical connection part as defined above, for assembly and electrical connection of said at least two electrical energy storage cells.

The assembly may also comprise at least two connection pins for the assembly and electrical connection of said at least two electrical energy storage cells and said at least one assembly and electrical connection part, one of said at least two connection pins being installed between said at least one assembly and electrical connection part and one of said at least two electrical energy storage cells, and the other of said at least two connection pins being installed between said at least one assembly and electrical connection part and the other of said at least two electrical energy storage cells.

Said at least two connection pins may be cylindrical in shape.

Said at least two connection pins may be installed free to rotate on said at least one assembly and electrical connection part and said at least two electrical energy storage cells.

At least one connection pin may have an insulating plug installed on it, and/or comprise a part packaged in an insulating material and/or comprise a foolproofing device.

Another purpose of another aspect of the invention is a module for the electrical assembly of an energy storage system, characterised in that it comprises:
    a plurality of assembly and electrical connection parts as defined above;
    a plurality of electrical energy storage cells as defined above, each cell being assembled and electrically connected to at least one other cell of the same type through at least one of the assembly and electrical connection parts.

The module may preferably be an electrochemical assembly module comprising an assembly of several elementary electrochemical cells.

The module may comprise means of retaining the electrical energy storage cells in position.

The retaining means may comprise wires and/or cables.

The retaining means may be crossed perpendicular to each other within the assembly module.

Each of the assembly and electrical connection parts may include a system for fastening the retaining means.

The module may comprise a plurality of cooling systems arranged in the interstitial spaces between the cells.

Furthermore, according to another aspect of the invention, its purpose is an energy storage system characterised in that it comprises an assembly of several modules as defined above.

Finally, another purpose of the invention is a method of manufacturing an assembly and electrical connection part as defined above and/or an electrical energy storage cell as defined above, characterised in that it comprises one or several of the following steps:
    make two similar half-parts designed to cooperate to form the assembly and electrical connection part, particularly two half-shells forming the packaging of the part,
    assemble the two half-parts to form the assembly and electrical connection part,
    make one or several current collectors in one or two parts, that can deform to approximately match the shape of a connection pin that will be inserted in the assembly and connection part,
    make the electrical energy storage cell from a core of an electrical energy storage cell in the form of a bobbin or a stack.

The two half-parts may be made from a material satisfying mechanical, thermal and electrical requirements and/or other usage conditions of the targeted application.

The two half-parts may for example be assembled by screwing, gluing, welding, by the presence of an attachment stud, crimping and other possibilities.

The shape of each half-part of the part may be such that one or several current collectors can be retained and may have a central groove to separate the coaxial connection pins from their current collector, thus avoiding the possibility of short circuiting the terminals in a single cell.

Advantageously, for electrical safety reasons, the packaging of the part, and particularly the two half-parts, may be made from a plastic material, particularly a thermosetting resin (for example epoxy, vinyl, methacrylic, silicone, polyurethane, polyamides, phenolics, formica, bakelite, unsaturated polyesters among others) or thermoplastic (for example ABS, HDPE, LDPE, LLDPE, PA, PEEK, PE, PET, PETE, PC, PMMA, POM, PP, PS, PPS, PTFE, PVC, or others), with or without fibre filler or reinforced by a woven or non-woven core, for example made of carbon, aramide, glass, ceramics (particularly silicon carbide, alumina, silicon oxide, mullite, aluminium nitride, silicon nitride, zirconium oxide, zirconia, boron nitride), bio-sourced fibres (particularly linen, hemp, nettle, banana, coconut, palm, date, bamboo). Fillers or additives can be added in order to modify the characteristics of this material. The packaging, and particularly the two half-parts, may then be made by moulding, injection or any other plastic material forming method.

The connection pins may be force-fitted into the cell or into the assembly and connection part.

The shape of the current collector(s) may be selected to hold the electrical wiring and may be held in place in the assembly and electrical connection part by the shape of the packaging or by a part added onto the packaging of the assembly and electrical connection part. The current collector(s) may preferably be made by a cutting or punching step and then by a bending or folding step. The internal wiring of the assembly and electrical connection part may be welded to the current collector(s) when they have been installed in the two half-parts.

The connection pins may be made by extrusion when their cross-section is circular. Any other cross-sectional shape may for example be machined or moulded.

Furthermore, the electrical energy storage cell may be made from a bobbin or a stack. The bobbin is an electrochemical core made by winding a superposed double positive electrode, a separator and a double negative electrode. The stack is in an electrochemical core made by stacking a double positive electrode, a separator and a double negative electrode.

In particular, for cells with a prismatic architectural geometry, an electrochemical core made by winding (bobbin) or by stacking (stack) can be used. One or several current collectors can be fixed to this electrochemical core on each side. There may be a current collector for each terminal or a single collector for the two terminals with a single pole. The current collector(s) may be composed of a hollow cylindrical shape into which the connection pin fits with a tight fit, and a tab that will be folded on the side of the electrochemical core in order to maintain the electrical contact. The hollow cylindrical shapes can be placed on the edge of each side of the cell.

Furthermore, for cells with a cylindrical architectural geometry, an electrochemical core can be used for each winding (bobbin). A current collector composed of three parts can be welded on the edge of each side of the electrochemical core. There is a portion with the shape of a flat disk onto which the edges are welded, the shapes of the other two portions matching the connection pins. This solution can only be used for series assembly of the cells. A variant that enables series or parallel assembly of the cells may consist of welding a current collector composed of two portions onto the edges of each side, one portion being in the form of a flat disk onto which the edges are welded and the other matching the shape of the connection pins, a current collection by a conducting part connecting the current collector to a terminal on the opposite face.

The same materials as those used for packaging of the assembly and connection part may be used for packaging of cells. Insert moulding by vacuum injection can then be done directly on the other elements of the cell and the cell can be filled with electrolyte, when necessary because this is not actually the case for ceramic and dielectric capacitors. The packaging or the packaging part in contact with the electrolyte may be made from a material that is chemically stable with the electrolyte. It is thus possible to make an aluminium packaging, for example by welding the different parts, provided that they are isolated from any part through which an electrical current passes (particularly edges, current collectors, terminals and others).

The characteristics stated in this description may be considered separately or in any technical possible combination with other characteristics.

BRIEF DESCRIPTION OF THE DRAWINGS

The invention will be more easily understood after reading the following detailed description of examples of non-limitative embodiments of the invention, and after an examination of the diagrammatic and partial views in the appended drawing, on which:

FIGS. 5A and 5B show sectional and perspective views respectively of an illustration of positions that can be occupied by two electrical energy storage cells according to the invention with a prismatic geometry relative to each other by rotation about connection pins, FIGS. 6A and 6B show sectional and perspective views respectively of an illustration of positions that can be occupied by two electrical energy storage cells according to the invention with a cylindrical geometry relative to each other by rotation about connection pins, FIGS. 10A and 10B show sectional and perspective views respectively illustrating the positions relative to each other that can be occupied by two electrical energy storage cells with cylindrical geometry, by rotation about connection pins, with the use of an assembly and electrical connection part like that shown in FIGS. 9A, 9B and 9C, FIG. 11 shows a perspective view of an example assembly or electrical assembly module according to the invention for several electrical energy storage cells connected to each other by several assembly and electrical connection parts, FIGS. 12A, 12B and 12C show a perspective view of an example assembly and electrical connection part according to the invention for an electrical energy cell with a prismatic architectural geometry, FIGS. 12B and 12C respectively showing the part with partial opening;

Identical references may denote identical or similar elements in all figures.

Furthermore, the different parts shown in the figures are not necessarily all at the same scale, to make the figures more easily readable.

DETAILED PRESENTATION OF PARTICULAR EMBODIMENTS

In all the examples described below, electrical energy storage cells 1 are elementary electrochemical cells 1 that will form electrochemical generators. Nevertheless, as mentioned above, the electrical energy storage cells may be of another type, particularly through the formation of electrochemical or dielectric capacitors and/or supercapacitors.

Furthermore, each elementary electrochemical cell 1 comprises an electrochemical core comprising a negative electrode, a positive electrode and an electrolyte between the negative and positive electrodes so that an electrochemical reaction can take place.

Each elementary electrochemical cell 1 may be made from a bobbin or stack. The bobbin is an electrochemical core made by winding a superposed double positive electrode, a separator and a double negative electrode. The stack is an electrochemical core made by stacking a double positive electrode, a separator and a double negative electrode.

Finally, the elementary electrochemical cells 1 disclosed herein are prismatic or cylindrical in shape. Obviously, the invention is not limited to a prismatic or cylindrical geometry of the cells 1 that may also have any other type of architectural geometry.

The elementary electrochemical cells 1 are particularly intended for integration in an electrochemical assembly module 20 in an energy storage system.

Figure 1A:
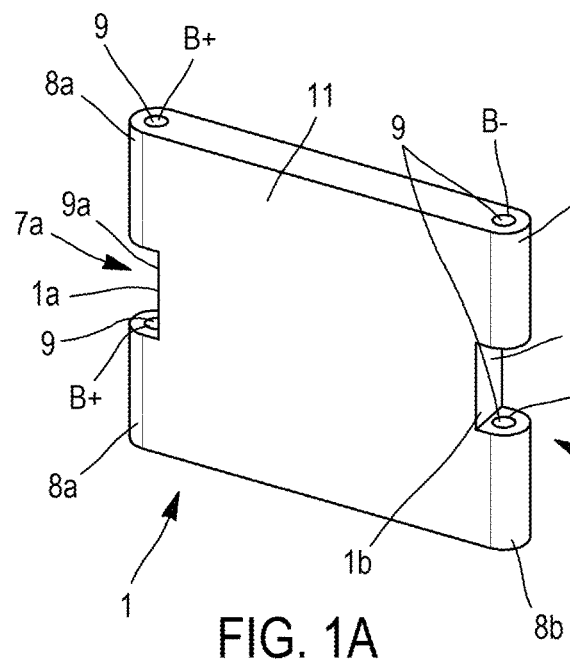
FIGS. 1A and 1B show perspective views of two example embodiments of an electrical energy storage cell 1 according to the invention, with a prismatic architectural geometry.
Figure 1B:
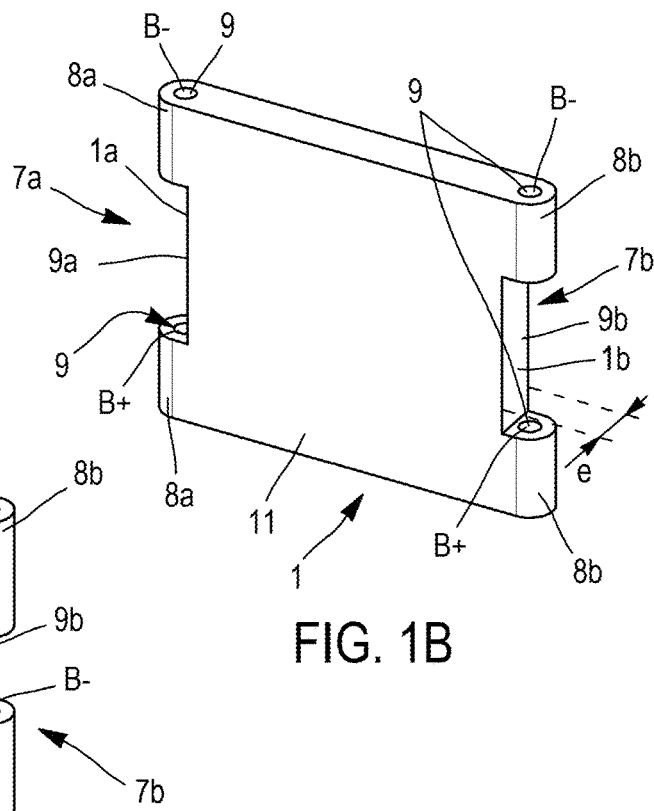

FIGS. 1A and 1B show diagrammatic and partial perspective views of two first example embodiments of electrical energy storage cells 1 according to the invention, of the same type as the elementary electrochemical cells 1.

FIGS. 1A and 1B show elementary electrochemical cells 1 with a prismatic architectural geometry.

The mechanical assembly and the electrical connection of such elementary electrochemical cells 1 to each other may be made by means of assembly and electrical connection parts 2 using connection pins 4 as described below, to make the cells 1 modular.

Each cell 1 comprises a first reception means 7a of a first assembly and electrical connection part 2 (not shown) on a first face 1a, and a second reception means 7b of a second assembly and electrical connection part 2 (not shown) on a second face 1b opposite the first face 1a (the first face 1a and the second face 1b being located within the thickness e of the cell 1).

Each of the first 7a and second 7b means of reception is also configured so that a connection pin 4 can pass through it (visible particularly in FIGS. 3B and 4B) so as to enable assembly and electrical connection respectively of the first and second assembly and electrical connection parts 2 with the electrical energy storage cell 1. This connection pin 4 may for example be a fuse between cells.

More precisely, the first face 1a of the cell 1 comprises two cell portions 8a extending in relief from the first face 1a and defining a first housing 9a between them to hold the first assembly and electrical connection part 2. Similarly, the second face 1b of the cell 1 comprises two cell portions 8b extending in relief from the second face 1b and defining a second housing 9b between them to hold the second assembly and electrical connection part 2.

Furthermore, each cell portion 8a, 8b in relief comprises a hole 9 through which a connection pin 4 can pass for assembly and electrical connection of the cell 1 with an assembly and electrical connection part 2.

In the example in FIG. 1A, the cell 1 is designed to enable an assembly only in series with an assembly and electrical connection part 2 and another cell 1 of the same type. Thus, the two cell portions 8a of the first face 1a form two terminals with the same polarity, for example positive B+. Similarly, the two cell portions 8b of the second face 1b form two terminals with the same polarity, for example negative B−, opposite the positive polarity B+ of the two cell portions 8a on the first face 1a.

In the example in FIG. 1B, the cell 1 is designed to enable parallel and in series assembly with an assembly and electrical connection part 2 and another cell 1 of the same type. Thus, the two cell portions 8a on the first face 1a form a positive polarity terminal B+ and a negative polarity terminal B− respectively. Similarly, the two cell portions 8b on the second face 1b form a positive polarity terminal B+ and a negative polarity terminal B− respectively, the positive polarity terminals B+ being located on the same side of the cell 1 (at the bottom) and the negative polarity terminals B− being located on the other side of the cell 1 (at the top).

Figure 2A:
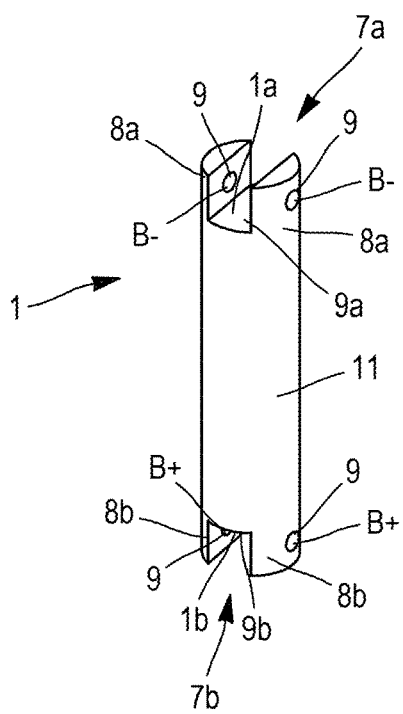
FIGS. 2A and 2B show perspective views of two example embodiments of an electrical energy storage cell 1 according to the invention, with a cylindrical architectural geometry, FIGS. 3A and 3B respectively show perspective views of a first example of a current collector and a connection pin on which such a current collector is installed, FIGS. 4A and 4B respectively show perspective views of a second example of a current collector and a connection pin on which such a current collector is installed.
Figure 2B:
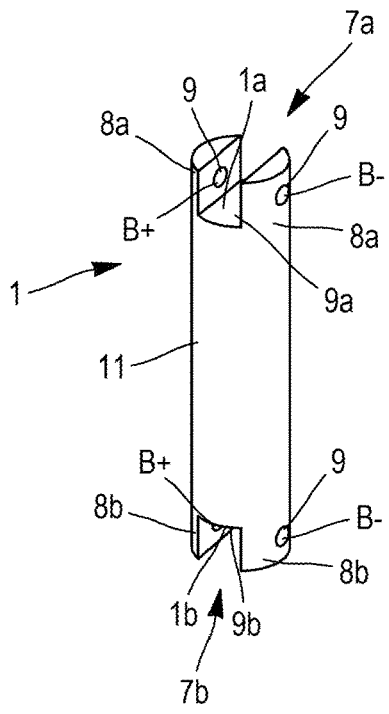

FIGS. 2A and 2B also show a diagrammatic and partial perspective view of two second example embodiments of electrical energy storage cells 1 according to the invention, of the elementary electrochemical cell 1 type.

The elementary electrochemical cells 1 in these FIGS. 2A and 2B have a cylindrical architectural geometry.

As described above for FIGS. 1A and 1B, each cell 1 comprises a first reception means 7a of a first assembly and electrical connection part 2 (not shown) on a first face 1a, and a second reception means 7b of the second assembly and electrical connection part 2 (not shown) on a second face 1b opposite the first face 1a (the first face 1a and the second face 2a being located within the thickness e of the cell 1). The first 7a and second 7b reception means comprise two cell portions 8a and two cell portions 8b respectively, defining the first housing 9a and second housing 9b respectively between them.

In the example in FIG. 2A, the cell 1 is designed to enable assembly only in series with an assembly and electrical connection part 2 and another cell 1 of the same type. Thus, the two cell portions 8a on the first face 1a form two terminals with the same polarity, for example negative B−. similarly, the two cell portions 8b of the second face 1b form two terminals with the same polarity, for example positive B+, opposite the negative polarity B− of the two cell portions 8a on the first face 1a.

In the example in FIG. 2B, the cell 1 is designed to enable parallel and series assembly with an assembly and electrical connection part 2 and another cell 1 of the same type. Thus, the two cell portions 8a on the first face 1a form a positive polarity terminal B+ and a negative polarity terminal B− respectively. Similarly, the two cell portions 8b on the second face 1b form a positive polarity terminal B+ and a negative polarity terminal B− respectively, the positive polarity terminals B+ being located on one side of the cell 1 (at the left) and the negative polarity terminals B− being located on the other side of the cell 1 (at the right).

Furthermore, in each of the examples in FIGS. 1A, 1B and FIGS. 2A, 2B, the positive terminals B+ or negative terminals B− are concealed by the packaging 11 and are thus accessible only through holes 9 through which the connection pins 4 can pass.

The holes 9 may have a small diameter. Furthermore, the holes in the two cell portions 8a or 8b located on the same face 1a or 1b of the cell 1 are advantageously through and coaxial.

According to the invention, the elementary electrochemical cells 1 described with reference to FIGS. 1A and 1B for cells 1 with a prismatic architectural geometry and with reference to FIGS. 2A and 2B for cells 1 with cylindrical architecture geometry, can be assembled and electrically connected to each other through assembly and electrical connection parts 2 like those described in the remaining of the description, through connection pins 4 positioned between the cells 1 and the parts 2.

Advantageously the connection pins 4, installed between the cells 1 and the parts 2, enable relative rotation between a cell 1 and the part 2 connected to it, or particularly between two cells 1 connected to each other through a single part 2. In other words, the connection pins 4 may advantageously be mounted in rotation on cells 1 and parts 2.

The connection pins 4 may be in the form of cylindrical rods. Assembly "pins" may be composed of balls pushed by springs to facilitate assembly and to enable electrical contact and maintain the required mobility.

The connection pin 4 may be fitted sufficiently tight into the cell 1 and/or the part 2 to enable good surface contact and also rotation, so that a connection pin can be installed free to rotate on an electrical energy storage cell 1 and/or on an assembly and electrical connection part 2. For a non-removable attachment, the connection pin 4 may have at least one part force fitted into cell 1 and/or into part 2.

Connection pins 4 between the cells 1 and the parts 2 may preferably be installed on a production line, and particularly automatically by a robot or by an operator.

The connection pins 4 may be rotated in the cells 1 and/or parts 2 by means of intermediate elements located in the cells 1 and/or the parts 2 at least partially matching the shape of the connection pins 4. In particular, these elements may consist of negative or positive current collectors 6, that also make the electrical connection between the cells 1 and parts 2.

Figure 3A:
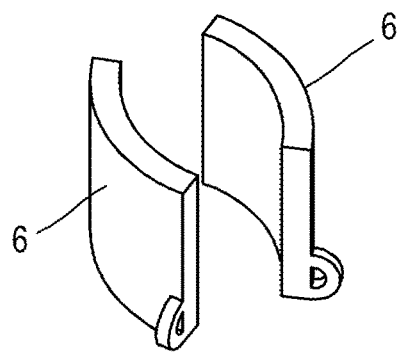
Figure 3B:
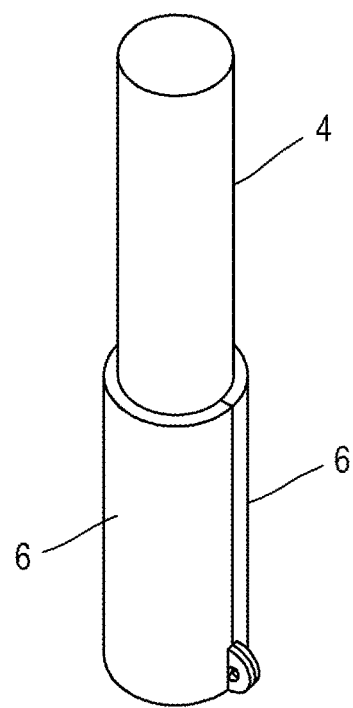

Thus FIGS. 3A and 3B show a perspective view of an example current collector 6 composed of two semi-cylindrical halves and a connection pin 4 on which this current collector 6 is installed.

The two halves of the current collector 6 in the form of semi-circular sections make it possible for the connection pin 4 to rotate relative to a cell 1 and/or a part 2 on which it is installed.

The assembly and the dimensions of the two halves of the current collector 6 may be determined so that they can deform to hold the connection pin 4 while maintaining an elastic return for maintaining contact with the connection pin 4.

Figure 4A:
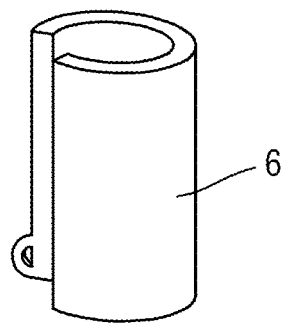
Figure 4B:
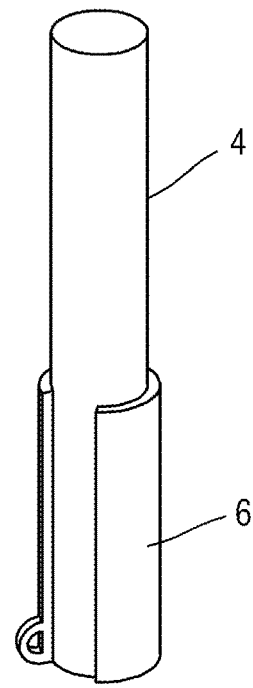

FIGS. 4A and 4B respectively show a perspective view of another example current collector 6 that is approximately entirely cylindrical and a connection pin 4 on which this current collector 6 is placed.

The current collector 6 may be in the form of an open cylinder. Its dimensions may be determined such that the current collector 6 can deform to hold the connection pin 4 while maintaining an elastic return for maintaining contact with the connection pin 4.

In the examples in FIGS. 3A, 3B and 4A, 4B, the connection pins 4 may have rounded ends to facilitate insertion into the current collectors 6.

For a non-removable assembly, the connection pins 4 may be at least partly force-fitted into cell 1 and/or into part 2, as mentioned above. Force-fitting may be done for example by forced insertion (for example, using a press or a mallet) or by shrink fitting (thermal expansion). Consequently, the current collectors 6 may be sufficiently rigid to resist force-fitting.

Advantageously, use of the assembly and electrical connection part 2 according to the invention between two elementary electrochemical cells 1 according to the invention provides significant modularity in the assembly due to possible rotation of one cell 1 relative to another cell 1 up to 360°. In this way, the possible rotation between cells 1 may allow an electrical assembly module 10 of such cells 1 to be in many shapes, for example it can match the bodywork of a car, and can enable the formation of a module 10 and/or a battery pack.

A cell 1 can be rotated relative to another cell 1 by up to 360°, and therefore the assembly can be made modular, due particularly to parallel positioning of the connection pins 4 in the assembly and connection part 2. Thus, the distance between the connection pins 4 is preferably greater than or equal to the thickness e of the cells 1, preferably all the same type.

FIGS. 5A and 5B show cross-sectional and perspective views respectively of an illustration of the positions that can be occupied by two cells 1 with prismatic geometry relative to each other by rotation about connection pins 4.

FIGS. 6A and 6B also show sectional and perspective views respectively of an illustration of the positions that can be occupied by two cells 1 with cylindrical geometry relative to each other by rotation about connection pins 4.

It is then observed that a cell 1 may be in any position in a sort of cylinder C with volume V, the centre of which is at the mid-point of the hinge lines of the assembly and electrical connection part 2.

We will now describe examples of particular embodiments of assembly and electrical connection parts 2 according to the invention with reference to FIGS. 7 to 10B, that can be used for the assembly and electrical connection between two elementary electrochemical cells 1 with a cylindrical architectural geometry.

Figure 7:
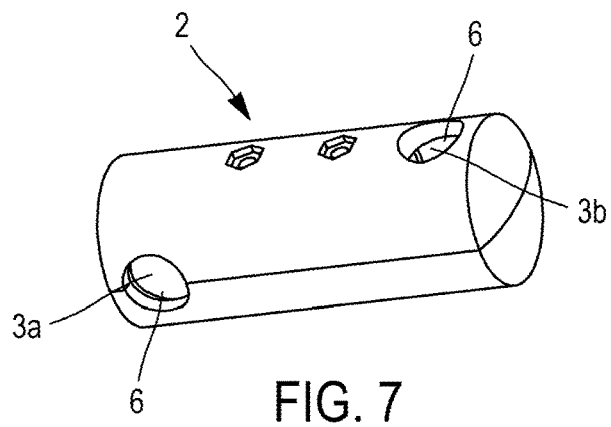
FIG. 7 shows a perspective view of a first example assembly and electrical connection part according to the invention, for an electrical energy storage cell with a cylindrical architectural geometry, FIGS. 8A and 8B respectively show perspective and sectional views of positions that can be occupied by two electrical energy storage cells according to the invention, with cylindrical geometry, relative to each other by rotation about connection pins 4, using an assembly and electrical connection part as shown in FIG. 7, FIGS. 9A, 9B and 9C show perspective views of a second example assembly and electrical connection part according to the invention for an electrical energy storage cell with cylindrical geometry, FIGS. 9B and 9C showing the part with partial opening according to two configurations with different rotations respectively.

FIG. 7 shows a perspective view of a first example assembly and electrical connection part 2 according to the invention for a cell 1 with a cylindrical geometry.

According to the invention, the part 2 comprises first 3a and second 3b means of connecting the part 2 to two cells 1 respectively that it is designed to connect. These first 3a and second 3b connection means are configured to enable connection pins 4 to pass through them for the assembly and electrical connection between part 2 and cells 1.

More particularly, the first 3a and second 3b connection means comprise first 5a and second 5b housings respectively through which connection pins 4 can pass for assembly and electrical connection of the part 2 with each of the cells 1.

Furthermore, each of the first 5a and second 5b housings comprises a cylindrically shaped negative or positive current collector 6 designed to at least partially match the shape of a connection pin 4.

Furthermore, in this first example embodiment of the part 2 for a cell 1 with cylindrical geometry, the first 5a and second 5b housings are formed approximately orthogonally in the part 2. In other words, the connection pins 4 that pass through the first 5a and second 5b housings are approximately orthogonal to each other.

Figure 8A:
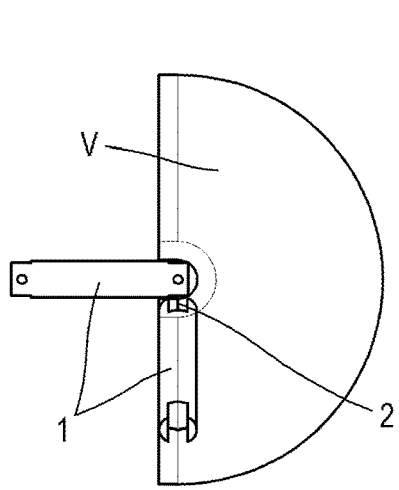
Figure 8B:
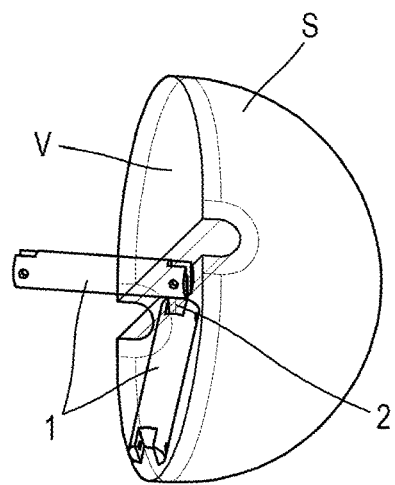

FIGS. 8A and 8B show sectional and perspective views respectively illustrating positions relative to each other that can be occupied by two cells 1 with cylindrical geometry by rotation about connection pins 4, through the use of a part 2 like that shown in FIG. 7.

Due to the possibility of having connection pins 4 approximately orthogonal to each other, a first cell 1 may thus occupy all positions included in a kind of half-sphere S with volume V, the base plane of which is located at the end of a second cell 1 to which the first cell 1 is connected.

Figure 9A:
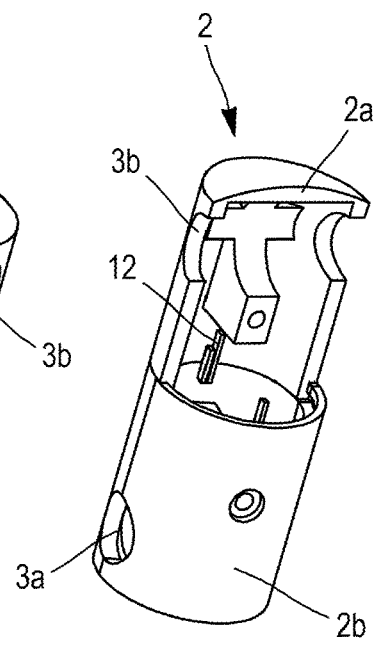
Figure 9B:
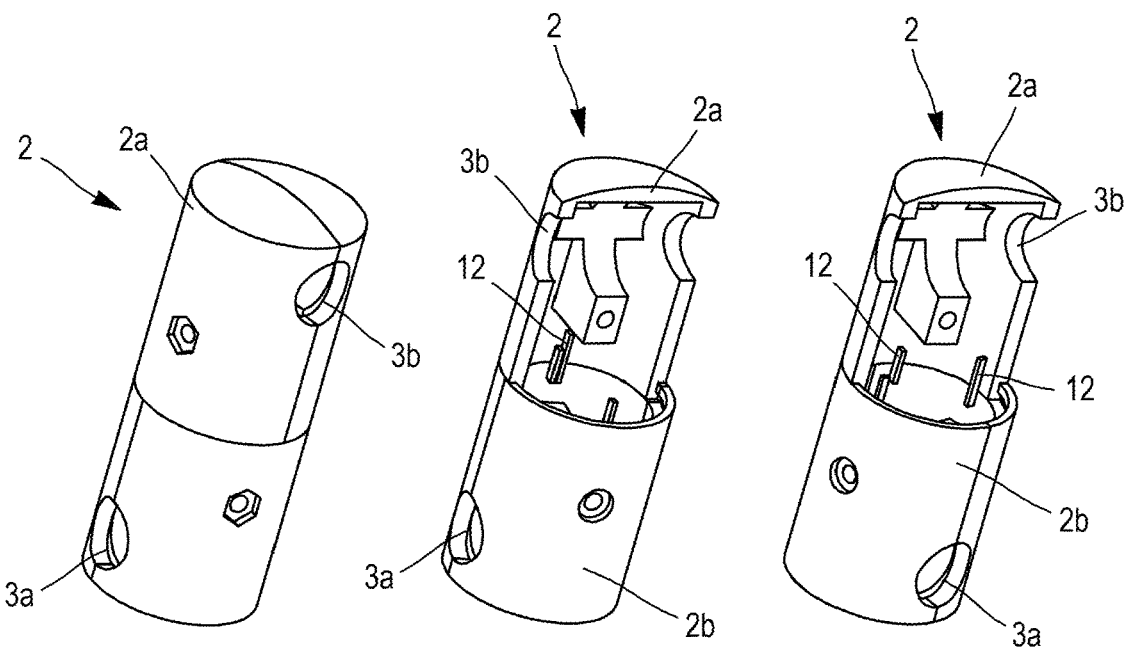
Figure 9C:
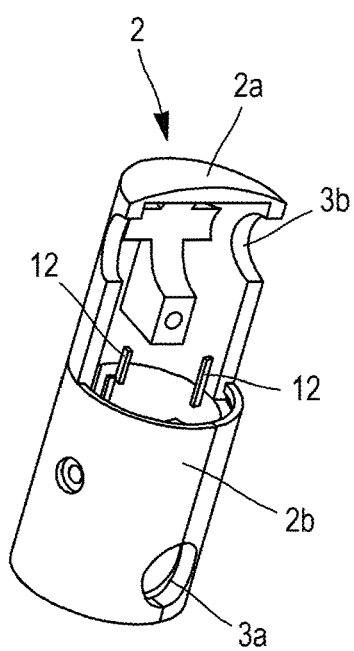

FIGS. 9A, 9B and 9C show perspective views of a second example of an assembly and electrical connection part 2 according to the invention for a cell 1 with cylindrical geometry. More precisely, FIG. 9A shows the part 2 in an assembled configuration, and FIGS. 9B and 9C show the part 2 partially open in two different configurations in rotation, respectively.

According to this second variant embodiment of a part 2 for a cell 1 with cylindrical geometry, the part 2 is divided into at least two parts 2a and 2b, particularly at the centre of the part 2, these two parts 2a and 2b being capable of being rotated relative to each other.

However, relative rotation between one part 2a and the other part 2b is limited to 180° by the preferred use of a rotation stop system 12 and particularly studs 12, particularly to avoid degradation of the internal wiring of the part 2.

In this respect, a comparison between FIGS. 9B and 9C shows the principle of stopping relative rotation of the two parts 2a and 2b by the use of the studs 12.

Possible rotation between the two parts 2a and 2b of the assembly and electrical connection part 2 according to the invention, although limited to 180° by the presence of studs 9, enables a first cell 1 to be in any position included within a kind of sphere S with volume V, the centre of which is located at the mid-point of the connection pin 4 connecting the second cell 1 to the part 2.

This possibility is thus illustrated in FIGS. 10A and 10B that show a sectional and perspective views respectively illustrating positions relative to each other that can be occupied by two cells 1 with cylindrical geometry by rotation about the connection pins 4, with the use of a part 2 like that shown in FIGS. 9A, 9B and 9C.

FIG. 11 also shows a perspective view of an example assembly or assembly electrical module 20 according to the invention of several elementary electrochemical cells 1 connected to each other by several assembly and electrical connection parts 2.

In particular, this example shows the possibility for the assembly 20 of comprising position retaining means 13. In the special case in which the cells 1 are intended to match three-dimensional shapes, it may be necessary to retain cells 1 in position within the assembly 20 by the use of position retaining means 13. These position retaining means 13 may for example comprise wires, cables (as is the case in the example in FIG. 11) and/or one or several other assemblies 20 of the same type. These position retaining means 13 may be crossed perpendicular to each other, in the same way as wires in a loom in conventional weaving methods.

FIGS. 12A, 12B and 12C also show perspective views of another example assembly and electrical connection part 2 according to the invention for a cell 1 with a prismatic architectural geometry, FIGS. 12B and 12C each showing the part 2 partially opened.

As described above, the part 2 comprises first 3a and second 3b means of connecting the part 2 to two cells 1 respectively that it will connect together. These first 3a and second 3b connection means are configured so that connection pins 4 can pass through them for the assembly and electrical connection between the part 2 and the cells 1.

More particularly, the first 3a and second 3b connection means comprise first 5a and second 5b housings respectively through which the connection pins 4 can pass for assembly and electrical connection of the part 2 with each of the cells 1.

Furthermore, each of the first 5a and second 5b housings comprises two negative or positive cylindrically shaped current collectors 6 that will at least partially match the shape of a connection pin 4.

When this part 2 is used in an assembly 20 fitted with position retaining means 13 as described above, it may be useful to include a system 14 for attachment of position retaining means 13 on the part 2, to prevent any damage to the different assemblies.

FIGS. 12A and 12B show the existence of such an attachment system 14 on the part 2, FIG. 12C showing the part 2 when this attachment system 14 is not existing.

The attachment system 14 may for example enable attachment of the wire or cable 13 holding the cells 1 in position. The attachment system 14 may preferably be made by a hole on each side at mid-distance from the two connection pins 4 housed in the first 5a and second 5b housings of the part 2, and at the centre of the part 2, in order to not stiffen the assembly of cells 1 on one side of the module 20.

As a variant, the attachment system 14 could also be made on the two faces of the part 2, and the position retaining means 13 could then be crossed.

The use of the attachment system 14 may also make it necessary to increase the length of the assembly and electrical connection part 2.

Figure 13A:
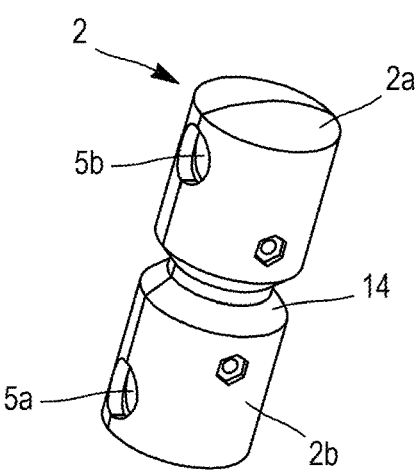
FIGS. 13A and 13B show perspective views of an example assembly and electrical connection part similar to that in FIGS. 9A, 9B and 9C with an attachment system in an assembled configuration and a partially open configuration respectively.
Figure 13B:
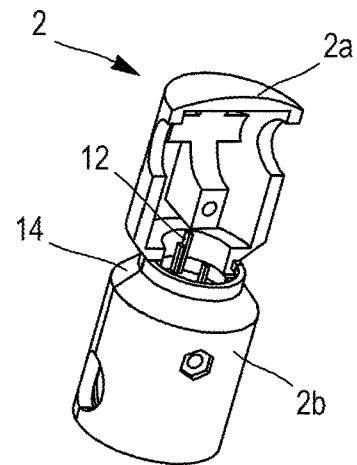

FIGS. 13A and 13B show perspective views of an example assembly and electrical connection part 2 similar to that in FIGS. 9A, 9B and 9C with the existence of an attachment system 14, in the assembled and partially open configurations respectively.

The attachment system 14 as described with reference to FIGS. 12A, 12B and 12C is not suitable for this variant of part 2 for a cell 1 with cylindrical geometry. As a result, the part 2 may comprise an attachment system 14 in the form of a groove 14 located at the middle of the part 2 (at the rotation) to provide a preferred position and thus facilitate crossing in the assembly of cells 1.

Figure 14A:
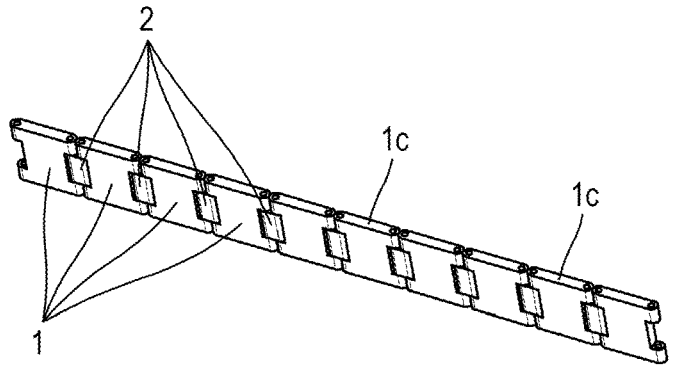
FIGS. 14A and 14B show perspective views of two other examples of electrical assembly modules according to the invention, comprising a plurality of electrical energy storage cells with a prismatic architectural geometry assembled to each other by a plurality of assembly and electrical connection parts.
Figure 14B:
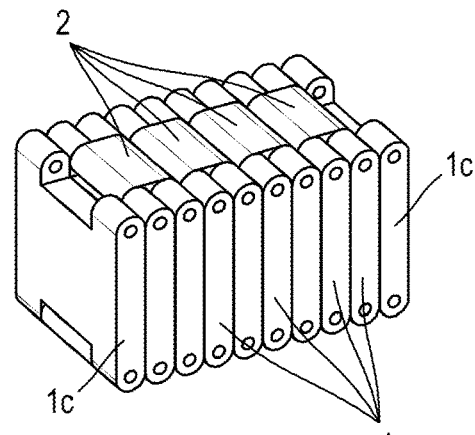

FIGS. 14A and 14B also show perspective views of two other examples of electrical assembly modules 20 according to the invention, comprising a plurality of cells 1 with prismatic geometry assembled to each other by a plurality of assembly and electrical connection parts 2.

For such assembly modules 20, temperature may preferably be managed using a cooling system 15 located at unconnected faces 1c of cells 1. However, other assemblies could be used, and particularly the interstitial space could be used for cells 1 with cylindrical geometry.

For cells 1 with prismatic geometry, the increase in the length of part 2 may be used to create an interstitial space 16 between the cells 1. Thus, for example the cooling system 15 may be located in this interstitial space 16. The cooling system 15 may for example consist of a cold plate, a heat duct system, a system with a fluid coolant, an electrical insulating spacer and/or a thermal conduction system.

Figure 15:
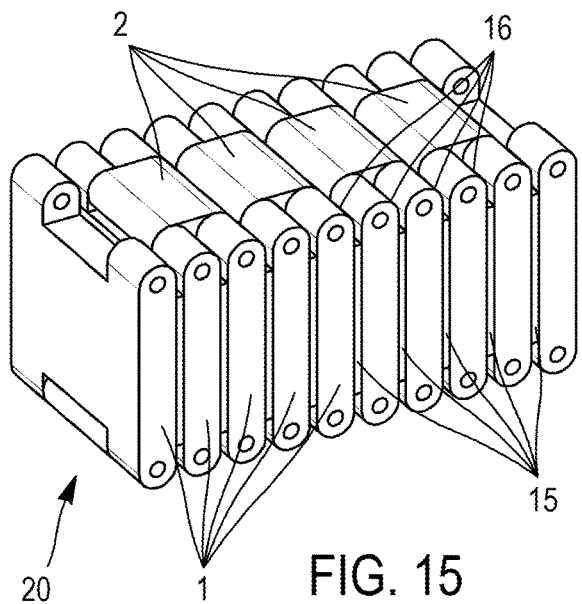
FIG. 15 shows a perspective view of an example electrical assembly module comprising a plurality of electrical energy storage cells and a plurality of cooling systems arranged in the interstitial spaces between the cells.

FIG. 15 thus shows a perspective view of an example assembly module 20 comprising a plurality of cells 1 and a plurality of cooling systems 15 located in the interstitial spaces 16 between the cells 1.

Furthermore, the dimensions of the assembly and connection part 2 are dependent on the dimensions of the electrochemical cells 1, consequently it is possible to have one or several hollow parts 17 in the part 2 that can be used for integration of one or several onboard electronic systems 18 and internal wiring 19.

Figure 16:
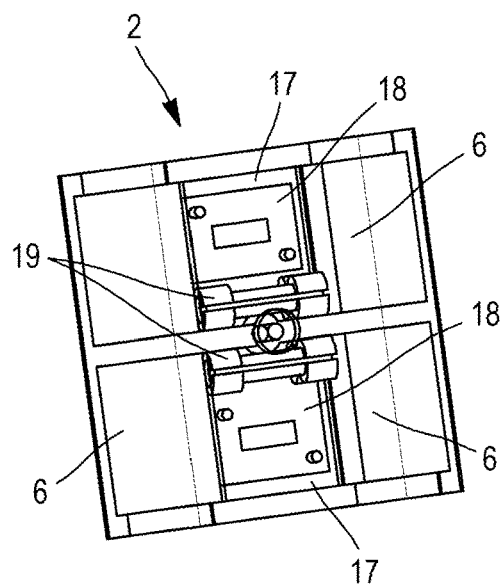
FIG. 16 shows a perspective view of an example assembly and electrical connection part comprising onboard electronic systems.

In this respect, FIG. 16 shows a perspective view of an example assembly and electrical connection part 2 comprising onboard electronic systems 18.

For example, the onboard electronic systems 18 may comprise sensors, a safety system and/or a communication device with BMS type control electronics.

If the cells 1 are not in a module and/or pack, a terminal part can be used with the same system of terminals as cells 1 and including all management systems for cells 1.

Figure 17:
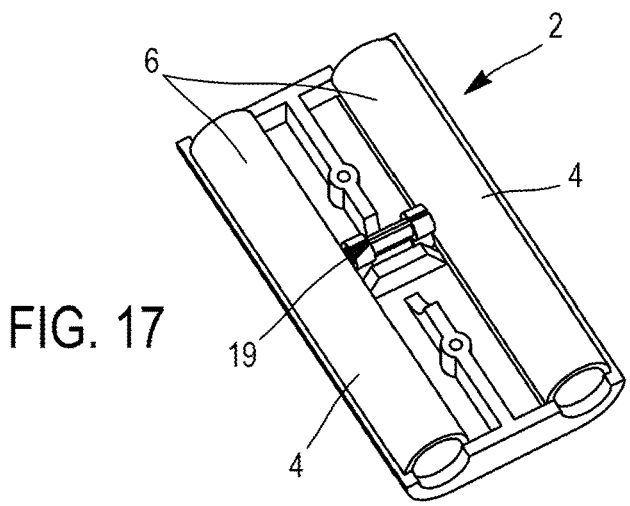
FIG. 17 shows a perspective view of an example assembly and electrical connection part that can be used only for series assembly of electrical energy storage cells.
Figure 18A:
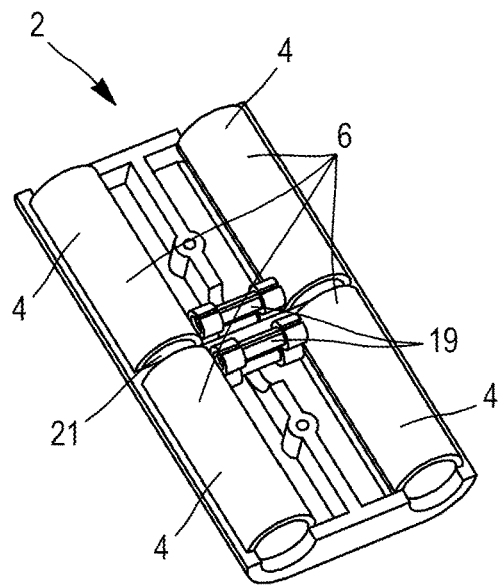
FIG. 18A shows a perspective view of an example assembly and electrical connection part that can be used only for parallel assembly of electrical energy storage cells.
Figure 18B:
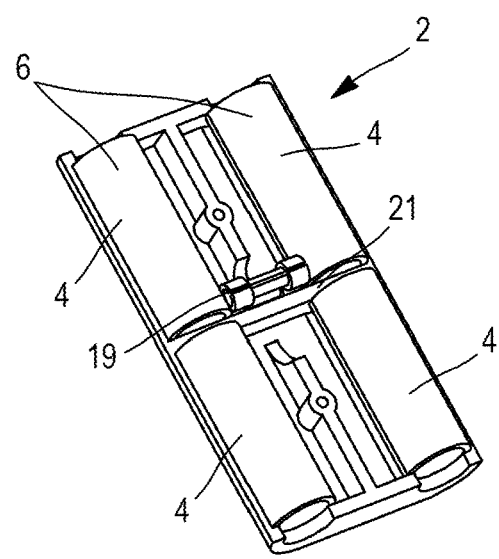
FIG. 18B shows a perspective view of another example assembly and electrical connection part that can be used only for series assembly of electrical energy storage cells.

Furthermore, FIGS. 17, 18A and 18B show the possibility of having different variants of assembly and electrical connection part 2, some of which enable installation of cells 1 in series only (FIG. 17) and others enable installation of cells 1 in parallel only (FIG. 18A).

More specifically, FIG. 17 shows a perspective view of an example assembly and electrical connection part 2 enabling only installation of cells 1 in series.

In this first variant, the two terminals B+ or B− of a single face 1a or 1b of cell 1 have the same pole (case of FIG. 1A described above). With this architecture, the cells 1 can only be connected in series, but they can carry a larger current. In this case, a single connection pin 4 is necessary between a cell 1 and a part 2. This connection pin 4 passes through part 2 and the two connections of cell 1.

Furthermore, FIGS. 18A and 18B show perspective views of an example assembly and electrical connection part 2 that allows the installation of cells 1 in series only and in parallel only respectively.

In this second variant, each of the two terminals B+ or B− on one face 1a or 1b of the cell 1 has opposite poles (case of FIG. 1B described above). In this case, a connection pin 4 is used for each B+ or B− terminal and the part 2 has a central part 21 isolating the two pins 4 and therefore the two poles. For this variant, two internal wirings 19 can be made on each side of the central part 21 for assembly of cells 1 in parallel only.

FIG. 18B also shows a perspective view of another example assembly and electrical connection part 2 in which cells 1 can be installed in series only.

As is the case for the example in FIG. 18A, each of the two B+ or B− terminals on one face 1a or 1b of the cell 1 has opposite poles (case of FIG. 1B described above). A connection pin 4 is also used for each B+ or B− terminal and the part 2 has a central part 21 isolating the two pins 4 and therefore the two poles. For this variant, a single internal wiring 19 can be made on one side of the central part 21 so that the cells 1 can be installed in series only.

Figure 19A:
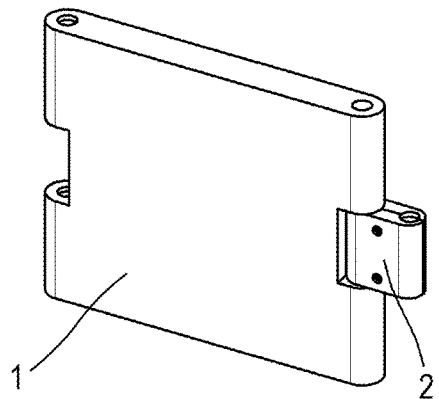
FIGS. 19A and 19B show perspective views of the assembly and electrical connection between an electrical storage cell and an assembly and electrical connection part using a connection pin, in a normal view and a see-through view respectively.
Figure 19B:
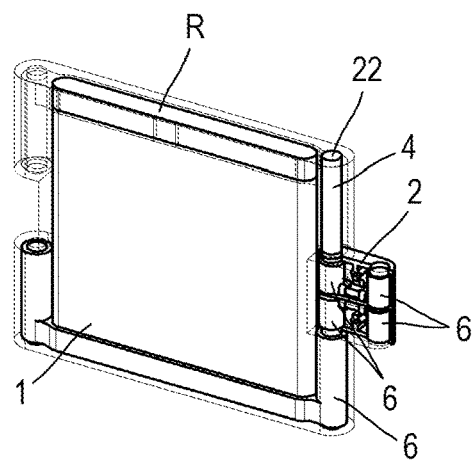

FIGS. 19A and 19B also show perspective full and see-through views respectively of the assembly and electrical connection between a cell 1 and a part 2 using a connection pin 4.

Different elements are preferably assembled to each other such that there will be no contact between the operator and the connection pin 4, to ensure operator safety. Therefore, the assembly is preferably made by a robot. The length of the connection pin 4 is such that when it is in place, the connection pin is not level with and does not project above the surface of the cell 1. The remaining hole is then closed off by an insulating plug 22 made from an electrically insulating material as shown in FIG. 19B, close to the edge R. Thus, this insulating plug 22 can be used to close off the connection pin 4 after the cell 1 and part 2 have been put into position, to ensure operator safety.

Figure 20A:
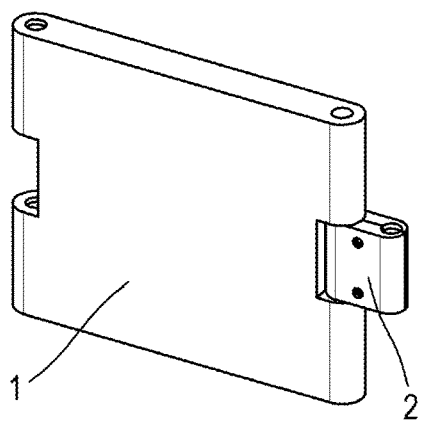
FIGS. 20A and 20B show perspective views of another variant of the assembly and electrical connection between an electrical storage cell and an assembly and electrical connection part using a connection pin, in a normal view and a see-through view respectively.
Figure 20B:
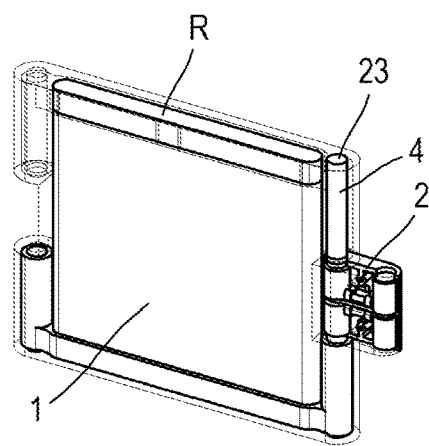

FIGS. 20A and 20B also show perspective full and see-through views respectively of another variant assembly and electrical connection between a cell 1 and a part 2 using a connection pin 4.

In this variant, manual installation by an operator consists of using a connection pin 4, of which part 23 is coated with an insulating material. The connection pin 4 is then made such that during assembly, when it brings the cell 1 and the assembly and electrical connection part 2 into contact, the part that has not yet penetrated into the cell 1 is the packaged part 23. A specific size may be necessary to use this type of connection pin 4, as described later. Furthermore, unlike the example in FIGS. 19A and 19B, there is no longer any hole to be closed off with this type of connection pin 4, since the part 23 of the connection pin 4 that reaches the edge of the hole is coated with insulating material.

Figure 21A:
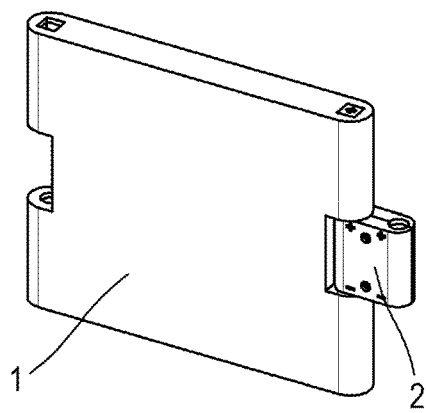
FIGS. 21A and 21B show a perspective top view and bottom view respectively of another example assembly and electrical connection between an electrical energy storage cell and an assembly and electrical connection part through a connection pin comprising a portion packaged with an insulating material with a foolproofing device.
Figure 21B:
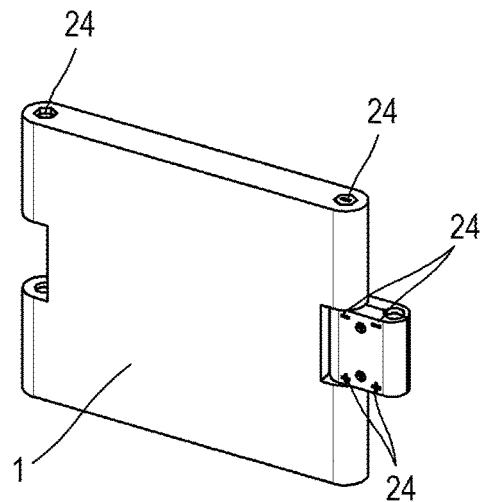
Figure 22:
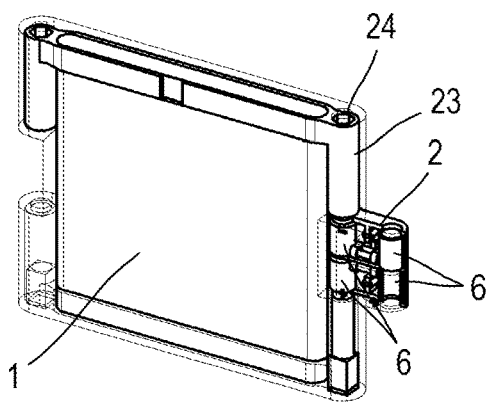
FIG. 22 shows the example in FIGS. 21A and 21B in a see-through view.

Furthermore, FIGS. 21A and 21B show a perspective top and bottom views respectively of another example assembly and electrical connection between a cell 1 and a part 2 through a connection pin 4 comprising a packaged part of an insulating material with a foolproofing device. FIG. 22 also shows a see-through view of the variant in FIGS. 21A and 21B.

It might be useful to use foolproofing devices 24 to show the different B+ or B− terminals and/or the electrical diagram and/or the direction of installation, to prevent errors during installation that could damage cells 1. It is thus possible to use a physical foolproofing device 24 on the part of the connection pin 4 that is installed tight, for example with pins wish a different head shape for positive and negative parts. If a part of the connection pin 4 is force fitted, this type of foolproofing device is such that the head of the pin 4 is preferably smaller than its nominal diameter if the force fitted part is in part 2. On the other hand, if the force fitted part is in the cell 1, the head of the connection pin 4 is preferably larger than its nominal diameter. The use of a physical foolproofing device 24 for the part of the connection pin 4 installed free to slide and to rotate is more difficult, but for example it could be achieved by using different sizes of connection pins 4 between the two terminals. It may also be possible to use a visual foolproofing device 24 for example representing the electrical diagram of the part 2 or the sign of the terminals. These visual foolproofing devices 24 may be in the form of relief and/or colour patterns, for example as shown on part 2 in FIGS. 21A and 21B.

In the example shown in FIG. 22, the connection pin 4 may comprise a part 23 coated with an insulating material, which also comprises a foolproofing device 24 on the head of the connection pin 4.

For the safety of operators and/or users of parts 2 and cells 1 according to the invention, the parts 2 and/or cells 1 may be made from a material or an assembly of materials satisfying mechanical, thermal and electrical requirements necessary for correct operation of cells 1 in their environment. For example, it would thus be possible to envisage a thermosetting resin (for example, epoxy, vinyl, methacrylic, silicone, polyurethane, polyamides, phenolics, formica, bakelite, unsaturated polyesters) or thermoplastic resin (for example, ABS, HDPE, LDPE, LLDPE, PA, PEEK, PE, PET, PETE, PC, PMMA, POM, PP, PS, PPS, PTFE, PVC), filled with fibres or reinforced by a woven or non-woven core for example such as carbon, aramide, glass, ceramics (particularly silicon carbide, alumina, silicon oxide, mullite, aluminium nitride, boron nitride, silicon nitride, zirconium oxide, zirconia), bio-sourced fibres (for example linen, hemp, nettle, banana, coconut, palm, date, bamboo).

The characteristics of this material can be modified by adding fillers or additives. A metal material (for example, iron, steel, stainless steel, aluminium) can be used provided that any part through which a current passes is insulated from it (particularly edges, current collectors, terminals, connection pins, wiring, etc.).

Furthermore, in order to enable modularity in positioning cells 1 with a prismatic geometry relative to each other, the maximum thickness of the assembly and connection part 2 is preferably equal to the thickness of cells 1 that it connects. Furthermore, the c/c distance of the part 2 is preferably equal to the thickness e of cells 1 that it connects. In some cases, the c/c distance may be larger, which creates an interstitial space 16 between cells 1, particularly in which a cooling device 15 may be inserted as described above, or a sensor, a safety system, etc. The height of the assembly and connection part 2 may be equal to the height of the cells 1 that it connects minus the height of the two terminals of cells 1.

For cells 1 with a cylindrical architectural geometry, the assembly and connection part 2 may be cylindrical, or even rounded prismatic. For a cylindrical part 2, the maximum radius may be equal to the radius of cells 1 minus the height of a terminal of a cell 1. For a prismatic part 2, the maximum thickness may be equal to the diameter of cells 1, the maximum height may be equal to the diameter of cells 1 minus the height of the two terminals of cells 1, and the minimum c/c distance may be equal to the diameter of the cells 1.

For a connection pin 4 for which a part 23 is packaged in an insulating material, the length of the part inserted in the terminal of cell 1 is preferably longer than the length of the part inserted in the assembly and connection part 2. The minimum packaging length is preferably longer than the length inserted in the assembly and connection part 2. In this case, the length inserted in the terminal of cell 1 is preferably longer than the length of the packaged part 23 so that sufficient electric current can pass through the terminal.

The area limiting the passage of electrical current is advantageously the smallest area perpendicular to the current flow. It may be designed as a function of the application and the electrical current. Preferably, this area is determined by a temperature calculation as a function of the electrical and thermal characteristics of the conductor, of the insulating material and the environment. Empirically, a first design may be determined using a maximum current density equal to 5 $A \cdot mm^{-2}$ in copper, 3 $A \cdot mm^{-2}$ in aluminium and 1.15 $A \cdot mm^{-2}$ in nickel. More particularly, the area limiting the current passage may be the developed contact area between the connection pin 4 and the current collector 6 (of the cell 1 or the part 2) or the cross-section of the connection pin 4, or the cross-section of its internal wiring.

Thus, the invention can be used for mechanical assembly of two electrical energy storage cells 1 to each other and their electrical connection. This mechanical assembly and this electrical connection are advantageously made using connection pins 4 made from a conducting material and that can be used to assemble the cells 1 and the assembly and electrical connection parts 2. The part 2 enables a modular assembly, because it is fixed to each of the two cells 1 through a pivot connection, which makes 360° relative rotation between two cells 1 about a pin possible. Furthermore, depending on the architecture of cells 1, internal wiring 19 of part 2 makes it possible to install cells 1 in parallel or in series. Operator safety with regard to electrical risks may be achieved by using a small diameter for holes providing access to the terminals, and by closing off of holes after the connection pin 4 is inserted, with a plug made from a non-conducting material 22 or by the use of a connection pin 4, of which part 23 is coated with a non-conducting material, in particular this part 23 possibly being an end of the pin 4.

In each embodiment described above, the outside portion of part 2 and particularly the half-shells forming the external packaging of part 2, include an electrically insulating material for electrical safety reasons.

Obviously, the invention is not restricted to the example embodiments that have just been described. Those skilled in the art could make various modifications to it.

The expression «comprising a» should be understood as being synonymous with «comprising at least one», unless mentioned otherwise.

The invention claimed is:
1. An assembly and electrical connection part for at least two electrical energy storage cells, the assembly and electrical connection part being configured to be provided in an electric assembly module of an energy storage system, the assembly and electrical connection part comprising:
first means for connecting the assembly and electrical connection part to a first one of said at least two electrical energy storage cells; and
second means for connecting the assembly and electrical connection part to a second one of said at least two electrical energy storage cells,
wherein the first and second means for connecting are configured to enable passage and assembly in rotation of respective connection pins about different axes of rotation to assemble and electrically connect the assembly and electrical connection part to each of said at least two electrical energy storage cells, wherein the first and second means for connecting include first and second housings, respectively, through which the respective connection pins are able to pass for the assembly and electrical connection of the assembly and electrical connection part with said at least two electrical energy storage cells, wherein an external portion of the assembly and electrical connection part is comprised of an electrically insulating material, and wherein the assembly and electrical connection part is divided into at least two portions, including a first portion and a second portion, rotatable relative to each other about a longitudinal axis of the assembly and electrical connection part.

2. The assembly and electrical connection part according to claim 1, wherein each of the first and second housings comprises at least one negative or positive current collector configured to at least partially match a shape of a corresponding connection pin of said connection pins.

3. The assembly and electrical connection part according to claim 1, wherein a distance between the first and second housings is greater than or equal to a thickness of at least one electrical energy storage cell of said at least two electrical energy storage cells.

4. The assembly and electrical connection part according to claim 1, wherein the rotation of the first portion of the assembly and electrical connection part relative to the second portion of the assembly and electrical connection part is limited by a rotation stop system.

5. The assembly and electrical connection part according to claim 1, further comprising fastening means for retaining said at least two electrical energy storage cells in position relative to each other, or a hole made on each of the at least two portions, at mid-distance from said connection pins.

6. The assembly and electrical connection part according to claim 1, further comprising one or a plurality of onboard electronic systems.

7. The assembly and electrical connection part according to claim 1, wherein the first and second means for connecting the assembly and electrical connection part form electrical fuses between said at least two electrical energy storage cells.

8. A method of manufacturing an assembly and electrical connection part according to claim 1, the method comprising:
making two similar half-parts designed to cooperate to form the assembly and electrical connection part,
assembling the two half-parts to form the assembly and electrical connection part,
making one or a plurality of current collectors in one or two parts, that are deformable to approximately match a shape of one of the connection pins that will be inserted in the assembly and connection part, and
making at least one of the at least two electrical energy storage cells from a core in the form of a bobbin or a stack.

9. The assembly and electrical connection part according to claim 1, wherein the assembly and electrical connection part is configurable, based on rotation about the different axes of the respective connection pins, according to a folded arrangement whereby the assembly and electrical connection part is perpendicular to a length of at least one of said at least two electrical energy storage cells, and a non-folded arrangement whereby the assembly and electrical connection part is not perpendicular to the length of at least one of said at least two electrical energy storage cells.

10. A pair of electrical energy storage cells, configured to be included within an electrical assembly module of an energy storage system, wherein each said electrical energy storage cell is configured to be assembled and electrically connected to at least one assembly and electrical connection part, each said electrical energy storage cell comprising at least one means for receiving said at least one assembly and electrical connection part on at least one face of a plurality of faces of said electrical energy storage cell, wherein each said at least one assembly and electrical connection part includes:
first means for connecting the assembly and electrical connection part to a first electrical energy storage cell of the pair of electrical energy storage cells, and
second means for connecting the assembly and electrical connection part to a second electrical energy storage cell of the pair of electrical energy storage cells, wherein the first and second means for connecting are configured to enable passage and assembly in rotation of respective connection pins about different axes of rotation to assemble and electrically connect the assembly and electrical connection part to each of the electrical energy storage cells, wherein the first and second means for connecting include first and second housings, respectively, through which the respective connection pins are able to pass for the assembly and electrical connection of the assembly and electrical connection part with the electrical energy storage cells, and wherein an external portion of the assembly and electrical connection part is comprised of an electrically insulating material, and wherein said at least one means for receiving is configured to allow passage and assembly in rotation of at least one of the connection pins for assembly and electrical connection between the at least one assembly and electrical connection part and the electrical energy storage cell, wherein the at least one assembly and electrical connection part is configurable, based on rotation about the different axes of the respective connection pins, according to a folded arrangement whereby the at least one assembly and electrical connection part is perpendicular to a length of at least one of the electrical energy storage cells, and a non-folded arrangement whereby the at least one assembly and electrical connection part is not perpendicular to the length of said at least one electrical energy storage cell, and wherein the assembly and electrical connection part is divided into at least two portions, including a first portion and a second portion, rotatable relative to each other about a longitudinal axis of the assembly and electrical connection part.

11. The pair of electrical energy storage cells according to claim 10,
wherein the at least one means for receiving includes first means for receiving a first assembly and electrical connection part on a first face of said plurality of faces of said electrical energy storage cell, and second means for receiving a second assembly and electrical connection part on a second face of said plurality of faces of said electrical energy storage cell, and wherein each of the first and second means for receiving is configured to allow passage of the respective connection pins for the assembly and electrical connection of the first assembly and electrical connection and the second assembly and electrical connection part with the electrical energy storage cell.

12. The pair of electrical energy storage cells according to claim 11,
wherein the first face of the plurality of faces of said electrical energy storage cell comprises a first set of two cell portions extending in relief from the first face and defining a first housing between the first set of two cell portions to contain the first assembly and electrical connection part, and
wherein the second face of the plurality of faces of said electrical energy storage cell comprises a second set of two cell portions extending in relief from the second face and defining a second housing between the second set of two cell portions to contain the second assembly and electrical connection part.

13. The pair of electrical energy storage cells according to claim 12, wherein each said cell portion, in relief, comprises a hole configured to allow for passage of one of the connection pins for the assembly and the electrical connection of the electrical energy storage cell with one of the first assembly and electrical connection part and the second assembly and electrical connection part.

14. The pair of electrical energy storage cells according to claim 12,
wherein the first set of two cell portions on the first face forms a first set of two terminals with a first polarity, and
wherein the second set of two cell portions of the second face forms a second set of two terminals with a second polarity, opposite the first polarity, for installation of the electrical energy storage cell in series.

15. The pair of electrical energy storage cells according to claim 12,
wherein the first set of two cell portions on the first face forms a first positive polarity terminal and a first negative polarity terminal, respectively,
wherein the second set of two cell portions on the second face forms a second positive polarity terminal and a second negative polarity terminal, respectively, and
wherein the first and second positive polarity terminals are located on a first same side as each other on one side of the electrical energy storage cell, and the first and second negative polarity terminals are located on a second same side as each other and on the other side of the electrical energy storage cell, for installation of the electrical energy storage cell in parallel.

16. The pair of electrical energy storage cells according to claim 10,
wherein each said electrical energy storage cell has a prismatic architectural geometry, and
wherein the at least one means for receiving includes first means for receiving on a first face of said plurality of faces of the electrical energy storage cell, and second means on a second face of said plurality of faces of the electrical energy storage cell, the first and second faces being opposite each other and located within a thickness of the electrical energy storage cell.

17. The pair of electrical energy storage cells according to claim 10,
wherein each said electrical energy storage cell has a cylindrical architectural geometry, and
wherein the at least one means for receiving includes first means for receiving on a first face of said plurality of faces of the electrical energy storage cell, and second means for receiving on a second face of said plurality of faces of the electrical energy storage cell, the first and second faces being opposite each other and located on two plane faces of said plurality of faces of the electrical energy storage cell.

18. An assembly comprising:
the pair of electrical energy storage cells according to claim 10, and
said at least one assembly and electrical connection part, for assembly and electrical connection of said pair of electrical energy storage cells.

19. The assembly according to claim 18, further comprising the connection pins for the assembly and electrical connection of said pair of electrical energy storage cells and said at least one assembly and electrical connection part,
wherein a first connection pin of said connection pins is installed between said at least one assembly and electrical connection part and one of the electrical energy storage cells of the pair of electrical energy storage cells, and
wherein a second connection pin of said connection pins is installed between said at least one assembly and electrical connection part and the other of the electrical energy storage cells of the pair of electrical energy storage cells.

20. The assembly according to claim 19, wherein said connection pins are cylindrical in shape.

21. The assembly according to claim 19, wherein said connection pins are installed free to rotate on said at least one assembly and electrical connection part and said pair of electrical energy storage cells.

22. The assembly according to claim 19, wherein at least one of the first connection pin and the second connection pin has an insulating plug installed thereon and/or comprises a part packaged in an insulating material and/or comprises a foolproofing device.

23. A module for the electrical assembly of an energy storage system, comprising:
a plurality of assembly and electrical connection parts, each said assembly and electrical connection part including:
first means for connecting the assembly and electrical connection part to a first one of at least two electrical energy storage cells, and
second means for connecting the assembly and electrical connection part to a second one of said at least two electrical energy storage cells,
wherein the first and second means for connecting are configured to enable passage and assembly in rotation of respective connection pins about different axes of rotation to assemble and electrically connect the assembly and electrical connection part to each of said at least two electrical energy storage cells,
wherein the first and second means for connecting include first and second housings, respectively, through which the respective connection pins are able to pass for the assembly and electrical connection of the assembly and electrical connection part with said at least two electrical energy storage cells, and
wherein an external portion of the assembly and electrical connection part is comprised of an electrically insulating material; and
a plurality of electrical energy storage cells, each said electrical energy storage cell being assembled and electrically connected to at least one other electrical energy storage cell of a same type through at least one of the assembly and electrical connection parts, wherein the assembly and electrical connection part is configurable, based on rotation about the different axes of the respective connection pins, according to a folded arrangement whereby the assembly and electrical connection part is perpendicular to a length of at least one of said at least two electrical energy storage cells, and a non-folded arrangement whereby the assembly and electrical connection part is not perpendicular to the length of at least one of said at least two electrical energy storage cells, and wherein the assembly and electrical connection part is divided into at least two portions, including a first portion and a second portion, rotatable relative to each other about a longitudinal axis of the assembly and electrical connection part.

24. The module according to claim 23, wherein the module is an electrochemical assembly module comprising an assembly of a plurality of elementary electrochemical cells.

25. The module according to claim 23, wherein the module comprises means for retaining position of the electrical energy storage cells.

26. The module according to claim 25, wherein the means for retaining position comprises wires and/or cables.

27. The module according to claim 25, wherein the means for retaining position are crossed perpendicular to each other within the module.

28. The module according to claim 25, wherein the plurality of assembly and electrical connection parts comprise a system for fastening the means for retaining position.

29. The module according to claim 23, wherein the module comprises a plurality of cooling systems arranged in interstitial spaces between the electrical energy storage cells.

30. An energy storage system, comprising an assembly of a plurality of modules according to claim 23.

* * * * *